United States Patent
Dunshea et al.

(10) Patent No.: US 9,189,291 B2
(45) Date of Patent: Nov. 17, 2015

(54) SHARING A KERNEL OF AN OPERATING SYSTEM AMONG LOGICAL PARTITIONS

(75) Inventors: Andrew Dunshea, Austin, TX (US); Diane G. Flemming, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 1721 days.

(21) Appl. No.: 11/301,113

(22) Filed: Dec. 12, 2005

(65) Prior Publication Data
US 2007/0136721 A1    Jun. 14, 2007

(51) Int. Cl.
G06F 3/00 (2006.01)
G06F 9/44 (2006.01)
G06F 9/46 (2006.01)
G06F 13/00 (2006.01)
G06F 9/50 (2006.01)
G06F 9/445 (2006.01)

(52) U.S. Cl.
CPC .............. G06F 9/5077 (2013.01); G06F 8/60 (2013.01)

(58) Field of Classification Search
CPC .............................. G06F 9/5077; G06F 8/60
USPC ......................................... 717/174; 719/319
See application file for complete search history.

(56) References Cited

U.S. PATENT DOCUMENTS

| | | | |
|---|---|---|---|
| 5,909,545 A | 6/1999 | Frese, II et al. | |
| 6,075,939 A | 6/2000 | Bunnell et al. | |
| 6,078,929 A | 6/2000 | Rao | |
| 6,272,519 B1 * | 8/2001 | Shearer et al. | 718/104 |
| 6,279,046 B1 | 8/2001 | Armstrong et al. | |
| 6,647,508 B2 * | 11/2003 | Zalewski et al. | 714/3 |
| 6,691,146 B1 | 2/2004 | Armstrong et al. | |
| 7,219,354 B1 * | 5/2007 | Huang et al. | 719/328 |
| 7,392,524 B2 | 6/2008 | Ault et al. | |
| 7,461,148 B1 * | 12/2008 | Beloussov et al. | 709/226 |
| 2003/0195996 A1 | 10/2003 | Jacobs et al. | |
| 2003/0233571 A1 | 12/2003 | Kraus et al. | |
| 2004/0205755 A1 * | 10/2004 | Lescouet et al. | 718/100 |
| 2004/0226017 A1 | 11/2004 | Leonard et al. | |
| 2005/0125466 A1 | 6/2005 | Tsujimoto | |
| 2005/0125486 A1 | 6/2005 | Chrysanthakopoulos et al. | |
| 2005/0235125 A1 | 10/2005 | Accapadi et al. | |
| 2006/0010446 A1 * | 1/2006 | Desai et al. | 718/100 |
| 2006/0031846 A1 | 2/2006 | Jacobs et al. | |
| 2007/0136721 A1 | 6/2007 | Dunshea et al. | |
| 2009/0228882 A1 | 9/2009 | Wang et al. | |

FOREIGN PATENT DOCUMENTS

JP         7056746         3/1995

OTHER PUBLICATIONS

Cory Janssen, techopedia.com, 1 page.*
U.S. Appl. No. 10/820,062, filed Apr. 6, 2004, Donald Ault.
(Continued)

*Primary Examiner* — Timothy A Mudrick
(74) *Attorney, Agent, or Firm* — DeLizio Law, PLLC

(57) ABSTRACT

Sharing a kernel of an operating system among logical partitions, including installing in a partition manager a kernel of a type used by a plurality of logical partitions; installing in the partition manager generic data structures specifying computer resources assigned to each of the plurality of logical partitions; and providing, by the kernel to the logical partitions, kernel services in dependence upon the generic data structures.

14 Claims, 9 Drawing Sheets

(56) References Cited

OTHER PUBLICATIONS

U.S. Appl. No. 10/828,455, filed Apr. 20, 2004, Jos Accapadi.
Bozman; Process Control Executive—A New Paradigm for Operating System Design; vol. 32; No. 12; May 1990; US.
Aiken; Sharing Data Sets Among Different Program Products That Share the Same Hard Disk; TDBS Sep. 1984; pp. 2105-2109; JP.
Callaghan; NFS Version 3 Protocol Specification; Sun Microsystems, Inc. Jun. 1995; US.
Marron; Sharing Read-Only Memory Among Multiple Logical Partitions; TDB; vol. 36; No. 3; Mar. 1993 US.
"U.S. Appl. No. 11/422,656 Office Action", Nov. 26, 2010, 11 pages.
"U.S. Appl. No. 11/422,656 Office Action", Aug. 24, 2009, 20 pages.
"U.S. Appl. No. 11/422,656 Final Office Action", Apr. 28, 2011, 15 pages.
"U.S. Appl. No. 11/422,656 Office Action", Mar. 3, 2010, 17 pages.
Aiken, et al., "Sharing Data Sets Among Different Program Products That Share the Same Hard Disk", TDBS Sep. 1984, Japan, Feb. 5, 2005, pp. 2105-2109.
Bozman, et al., "Process Control Executive—A New Paradigm for Operating System Design", vol. 32, No. 12; US, May 1990, 414-419.
Callaghan, et al., "NFS Version 3 Protocol Specification", Sun Microsystems Inc., US, Jun. 1995, 1-118.
Poellabauer, et al., "KECho—Event Communication for Distributed Kennel Services", Georgia Institute of Technology, 2002, 83-97.

* cited by examiner

SHARING A KERNEL OF AN OPERATING SYSTEM AMONG LOGICAL PARTITIONS

BACKGROUND OF THE INVENTION

1. Field of the Invention

The field of the invention is data processing, or, more specifically, methods, systems, and products for sharing a kernel of an operating system among logical partitions.

2. Description of Related Art

A thread is a unit of software execution on a multi-threaded computer. That is, a thread is an executable entity of work in a computer system. A thread can be viewed of as a separate stream of executable computer program instructions. On such a computer, software programs are executed in units of execution called 'processes' that include all the processor registers, code segment and offset registers, data segment and offset registers, stack segment and offset registers, flag registers, instruction pointer registers, program counters, and so on, needed for execution of software programs. For efficiency, 'processes' are organized further as threads, where each thread of a process individually possesses all the attributes needed for execution except that a thread shares memory among all the other threads of a process, thereby reducing the overhead of operating system switches from thread to thread ('context switches').

Two modes of multi-threading are discussed in this specification: simultaneous multi-threading ('SMT') and single-threaded ('ST') multi-threading. ST multi-threading is time-multiplexed multi-threading, that is, multi-threading by use of time slices or time quanta. In ST mode, both individual threads and virtual processors are assigned to a portion of a processor's computing capacity apportioned in segments of time, each of which is referred to as a 'time slice' or 'time quantum.'

Some processors accept computer program instructions from more than one thread simultaneously, a feature referred to as 'simultaneous multi-threading' or 'SMT.' The idea behind SMT is to share the processor hardware on a chip among multiple threads of a multi-threaded workload. SMT is a technique that lets multiple independent threads issue instructions to a single physical processor in a single processing cycle. Traditional processor architectures issue instructions to a processor from only one thread at a time. An example of a processor that implements SMT as described here is IBM's Power5™ processor.

SMT is implemented on physical processors each of which is capable of accepting instructions from more than one thread of execution simultaneously. Also in SMT mode, both virtual processors and threads running on virtual processors may be apportioned through time slices. A thread of execution on a virtual processor in SMT mode may be viewed as running on a logical processor. A virtual processor running on a physical processor in SMT mode therefore may be viewed as supporting more than one logical processor. Whether a thread runs in ST mode or in SMT mode, a thread running on a logical processor is unaware of the logical or virtual nature of the processor and views it as a traditional processor.

Multiprocessing is implemented in computers that support multiple logical partitions in ST mode or SMT mode partition-by-partition. Each partition traditionally implements an entire separate operating system including a separate kernel. Even a single instance or image of a kernel consumes memory resources, and each additional copy of such an image consumes a multiple of memory resources. When the number of partitions and therefore the number of kernel images is large, memory consumption can become a limiting factor in system administration.

SUMMARY OF THE INVENTION

Methods, systems, and computer program products are disclosed for sharing a kernel of an operating system among logical partitions, thereby reducing consumption of memory and other system resources. Methods, systems, and computer program products for sharing a kernel of an operating system among logical partitions according to embodiments of the present invention typically include installing in a partition manager a kernel of a type used by a plurality of logical partitions; installing in the partition manager generic data structures specifying computer resources assigned to each of the plurality of logical partitions; and providing, by the kernel to the logical partitions, kernel services in dependence upon the generic data structures.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
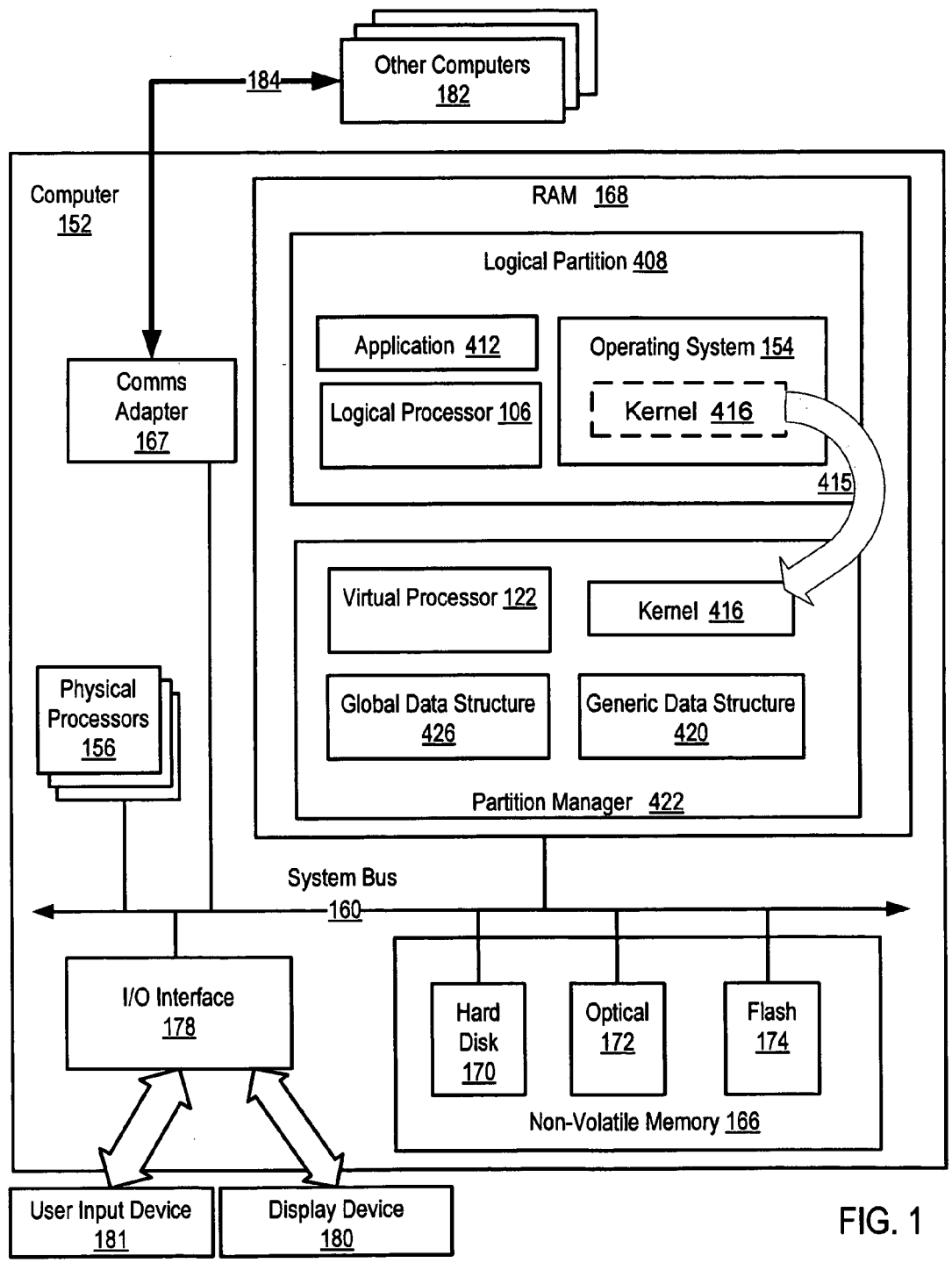
FIG. 1 sets forth a block diagram of automated computing machinery comprising an exemplary computer useful in sharing a kernel of an operating system among logical partitions according to embodiments of the present invention.

Exemplary methods, systems, and products for sharing a kernel of an operating system among logical partitions according to embodiments of the present invention are described with reference to the accompanying drawings, beginning with FIG. 1. Sharing a kernel of an operating system among logical partitions in accordance with the present invention is implemented upon automated computing machinery, that is, on one or more computers. FIG. 1 sets forth a block diagram of automated computing machinery comprising an exemplary computer (152) useful in sharing a kernel of an operating system among logical partitions according to embodiments of the present invention. The computer (152) of FIG. 1 includes several physical processors (156) as well as random access memory ("RAM") (168) which is connected through a system bus (160) to the physical processors and to other components of the computer.

Stored in RAM (168) is a logical partition (408), an application program (412), an operating system (154), a logical processor (106), a partition manager (422), a kernel (416), and a virtual processor (122). A logical partition ('LPAR') (408) is a set of data structures and services that enables distribution of computer resources within a single computer to make the computer function as if it were two or more independent computers. Each logical partition is assigned all the resources it needs to operate as though it were an independent computer including, processor time, memory, an operating system, and so on. A logical partition and the resources made available to applications through a logical partition are sometimes referred to collectively as a 'virtual machine.' For convenience of explanation, the system of FIG. 1 includes only one logical partition, but systems that share kernels among logical partitions according to embodiments of the present invention may support any number of logical partitions.

An application program (412) is a module of user-level computer program code. Applications programs are non-privileged code that must obtain access to computer resources by calls through an operating system to a kernel.

An operating system (154) is a layer of system software that schedules threads and provides functions for making system resources available to threads, including memory access, access to input/output resources, and so on. Operating systems also control allocation and authorization for access to computer resources. Operating systems carry out low-level, basic tasks, such as recognizing input from a keyboard, sending output to a display screen, keeping track of files and directories on a magnetic disk drive, and controlling peripheral devices such as disk drives and printers. The operating system is also responsible for security, ensuring that unauthorized users do not access the system and that threads access only resources they are authorized to access. Many operating system functions are implemented by a kernel, in this example, a shared kernel. Operating systems useful for sharing a kernel of an operating system among logical partitions according to embodiments of the present invention are multi-threading operating systems, examples of which include UNIX™, Linux™, Microsoft XP™, AIX™, IBM's i5os, and many others as will occur to those of skill in the art.

A logical processor (106) is an operating system's structure for scheduling threads for execution. That is, rather than scheduling threads for execution on a physical processor or a virtual processor, operating system (154) schedules threads for execution on a logical processor (106). Scheduling a thread on a logical processor provides convenient structure and processing in which the thread appears, from the point of view of the thread, to have at its disposal all the resources of an entire logical partition. Virtual processors are apportioned fractions of a physical processor. A logical processor, however, is logically an entire processor—despite the fact that it is physically running in a fractional time slice just like all other execution on the machine. A thread running on a logical processor in an LPAR appears, therefore, from its point of view, to have all the resources of an entire independent computer. That is, the logical processor is the object upon which a dispatcher in an operating system running in a partition dispatches threads, and a virtual processor is what is dispatched by the partition manager. In an LPAR operating in ST mode, the correspondence between logical processors and virtual processors is one-to-one, one logical processor for each virtual processor. In an LPAR operating in SMT mode, the correspondence between logical processors and virtual processors is N-to-one, where N is the number of logical processors supported on a virtual processor, that is, N logical processors for each virtual processor.

A virtual processor (122) is a subsystem, composed of data structures and computer program instructions, that implements assignment of processor time to a logical partition. A shared pool of physical processors supports the assignment of partial physical processors (in time slices) to a logical partition. Such partial physical processors shared in time slices are referred to as 'virtual processors.' Physical processors held in a shared processing pool are shared among logical partitions. In the examples in this specification, physical processors are shared according to processing units with 1.0 processing units representing the processing capacity of one physical processor. Assigning a thread to run on a virtual processor is typically carried out by assigning the thread to run on a logical processor of a virtual processor. In ST mode, each virtual processor has one logical processor. In SMT mode, however, each virtual processor has two logical processors.

The partition manager (422) of FIG. 1 is a layer of system software that runs under logical partitions. That is, a partition manager (422) runs between the logical partitions and underlying computer hardware, physical computer components, including physical processors. The partition manager supports and enables establishing and running multiple operating systems and applications in multiple logical partitions. Among other things, the partition manager supports a user's or system administrator's establishing partitions, virtual processors, and logical processors. Just as kernel of an operating system in a computer that supports multiple logical partitions schedules and dispatches threads on logical processors, the partition manager schedules and dispatches virtual processors on physical processors. Because an operating system in a logical partition is often used to run a particular application or set of applications, a partition manager makes it possible to run multiple operating systems and their applications in a single computer, reducing overall hardware costs. Production and test systems can run at the same time in the same hardware. In addition, with a partition manager supporting multiple logical partition, different operating systems such as Windows and Linux can share the same underlying computer hardware. A partition manager is the kind of software sometimes referred to as a 'hypervisor,' a 'virtualization manager,' or a 'virtual machine monitor.'

In the example of FIG. 1, partition manager (422) is a computer software module with hardware support that includes computer program instructions capable of installing in the partition manager a kernel (416) of a type used by a plurality of logical partitions and installing in the partition manager generic data structures (420) specifying computer resources assigned to each of the plurality of logical partitions. Partition manager (422) includes a generic data structure (420) whose contents specify computer resources assigned to each of a plurality of logical partitions. Generic data structure (420) is implemented by use of a global data structure (426). Global data structure (426) is a data structure of a kind sometimes referred to as a 'device tree,' a structure loaded at system initial program load time from information stored in non-volatile memory. In various forms of Unix, for example, a device tree may be loaded from information stored on disk at storage path locations '/devices' and '/dev.' In this example, global data structure (426) is globally available to kernels in the partition manager and specifies computer resources available on the computer system for use through logical partitions, that is, for use by applications running in logical partitions. Examples of a global data structure (426) and a generic data structure (420) are explained in more detail below with reference to FIGS. 7A and 7B.

In the example of FIG. 1, partition manager (422) includes a kernel (416) which, as illustrated, has been removed (415) to the partition manager from an operating system (154) in a logical partition (408). A kernel is the core of an operating system. A kernel is the privileged module or modules sometimes also known as a 'system executive' or 'system monitor.' The kernel is the software responsible for providing secure access to computer system hardware on behalf of threads of execution in applications and in other operating system components—including access to memory, processing capacity, input/output resources, and so on. The kernel also schedules threads of execution that make up application programs as well as operating system processes. The kernel also typically provides services for interprocess communications and synchronization such as memory locks, signals, and semaphores. Kernels typically also provide hardware abstraction—a set of instructions universal to all devices of a certain type—to hide the underlying complexity from applications and from other components of an operating system. Hardware abstraction components in turn rely upon software drivers to provide functions specific to a hardware device's manufacturing specifications. In summary, the kernel provides kernel services that:
- control and mediate access to system hardware;
- implement and support fundamental abstractions: processes, threads, files, devices, and so on;
- allocate and schedule system resources: memory, processors, disks, file descriptors, process descriptors, thread descriptors, and so on;
- enforce security and protection of system resources; and
- respond to user and application requests for service through system calls.

In the example of FIG. 1, kernel (416) is improved according to embodiments of the present invention to provide kernel services to logical partitions in dependence upon generic data structures (420). A traditional kernel at boot time loads its own device tree specifying all the hardware components of the system and other resources available to applications and other operating system components running in the partition where the traditional kernel is installed in an operating system. Kernel (416), however, is no longer located in a single partition. Kernel (416) has been removed to partition manager space and may be used by any number of logical partitions that use the same type of operating system and kernel. Each such logical partition may require a different complement of computer hardware. Partition manager (422) therefore provides a generic data structure (420) for each logical partition specifying the computer hardware and other resources available and assigned for use by each logical partition, and kernel (416) is improved to provide kernel service according to the hardware and resources specified for a logical partition in a generic data structure for that particular partition.

The computer software components, application (412), logical partition (408), logical processor (106), operating system (154), partition manager (422), virtual processor (122), kernel (416), and so on, in the example of FIG. 1 are shown disposed in RAM (168). Readers of skill in the art, however, will recognize that many components of such software may be stored in non-volatile memory (166) also. Computer (152) of FIG. 1 includes non-volatile computer memory (166) coupled through a system bus (160) to processor (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 1 includes a communications adapter (167) for implementing data communications (184) with other computers (182). Such data communications may be carried out, for example, through data communications networks such as IP networks—and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 2:
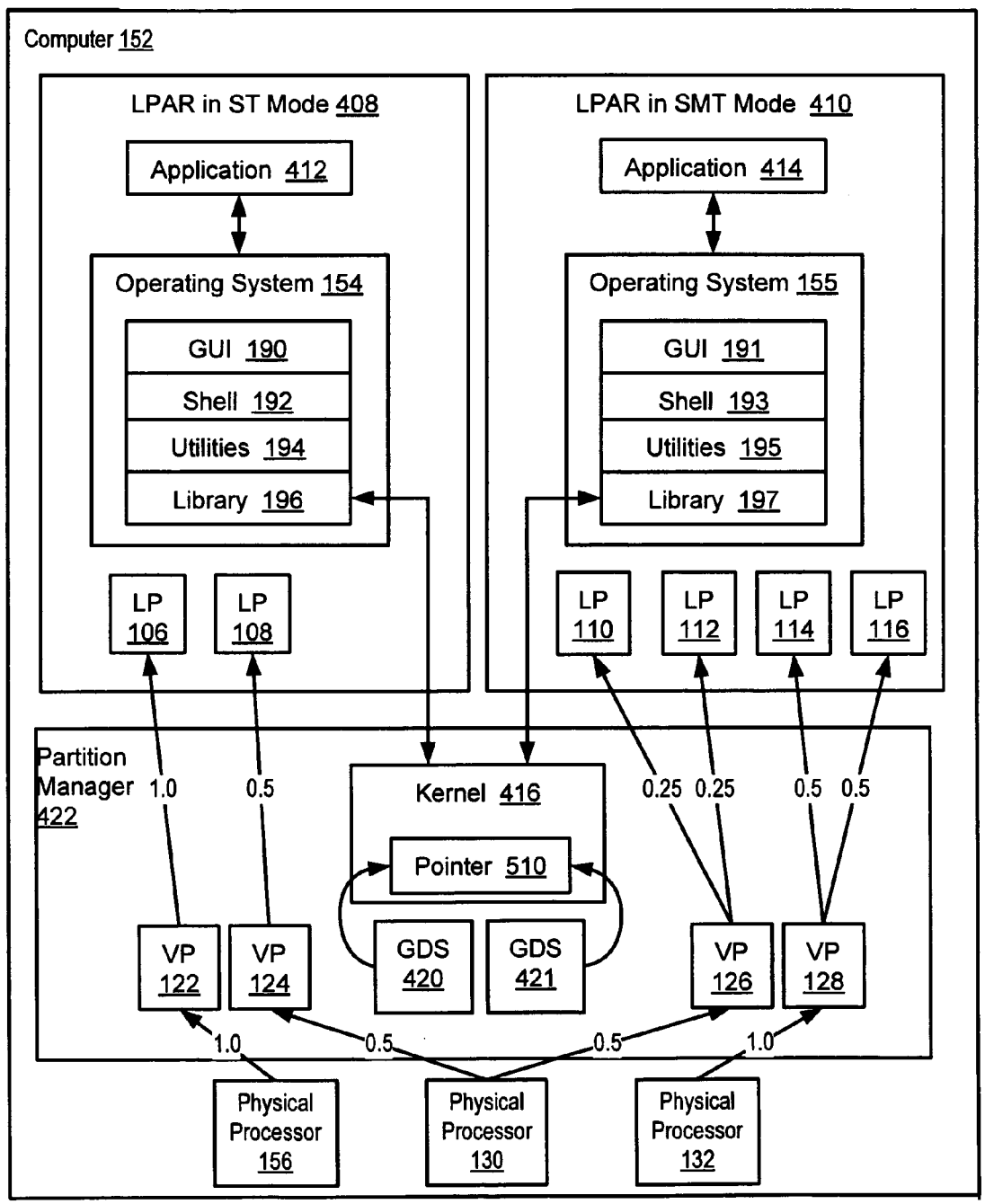
FIG. 2 sets forth a functional block diagram illustrating an exemplary system for sharing a kernel of an operating system among logical partitions according to embodiments of the present invention.

For further explanation, FIG. 2 sets forth a functional block diagram illustrating an exemplary system for sharing a kernel of an operating system among logical partitions according to embodiments of the present invention. The system of FIG. 2 includes two logical partitions, one in ST mode (408) and one in SMT mode (410).

The system of FIG. 2 includes six logical processors, two (106, 108) for logical partition (408) and four (110, 112, 114, 116) for logical partition (410). The system of FIG. 2 also includes four virtual processors, two (122, 124) assigned to logical partition (408) and two (126, 128) assigned to logical partition (410). The system of FIG. 2 also includes three physical processors (156, 130, 132). In this example, the processing capacity of the three physical processors (156, 130, 132) is apportioned to the logical partitions as follows:
- All of the processing capacity of physical processor (156) is assigned entirely to virtual processor (122), so that logical processor (106) has available to it the entirety of physical processor (156).

One-half the processing capacity of physical processor (130) is assigned to virtual processor (124), so that logical processor (108) has available to it in time slices one-half of physical processor (130).

One-half the processing capacity of physical processor (130) is assigned to virtual processor (126). Virtual processor (126) is assigned to logical partition (410) which runs in SMT mode with two logical processors (110, 112) for virtual processor (126). Logical processor (110) and logical processor (112) each has available to it in time slices one-fourth of the processing capacity of physical processor (130).

All of the processing capacity of physical processor (132) is assigned to virtual processor (128). Virtual processor (128) is assigned to logical partition (410) which runs in SMT mode with two logical processors (114, 116) for virtual processor (128). Logical processor (114) and logical processor (116) each has available to it in time slices one-half of the processing capacity of physical processor (132).

The system of FIG. 2 includes a partition manager (422). In the example of FIG. 2, partition manager (422) includes computer program instructions capable of sharing a kernel of an operating system among logical partitions according to embodiments of the present invention that include installing in the partition manager a kernel (416) of a type used by a plurality of logical partitions (408, 410) and installing in the partition manager generic data structures (420, 421) specifying computer resources assigned to each of the plurality of logical partitions.

The system of FIG. 2 includes two operating systems (154, 155), one each in logical partition (408) and logical partition (410) respectively. In this example, operating system features directly accessible to applications or users remain in the logical partitions. Such features include support for graphical user interfaces ('GUIs') (190, 191). Such features also include support for shells (192, 193) that provide, for example, command line interfaces to operating system utilities and library functions. Operating system features directly accessible to applications or users also include system utilities (194, 195). System utilities include programs for system management that are typically accessible through a GUI or a shell such as, for example, programs to create, open, or deleted files, programs to create and navigate directories of a file system, programs to read and set environment variables, search for text inside a file, and so on.

Operating system features directly accessible to applications or users also include libraries of system calls (196, 197). System call libraries exposed application programming interfaces ('APIs') that allow calling programs to gain access to hardware-dependent services and other protected system resources by calls into privileged software routines inside the kernel (416). Such calls to privileged code in kernel space are effected by interrupts or software traps called from within functions of the system call libraries. Access to function calls within system call libraries typically is effected by compiling one or more system call libraries into an application or utility or into another library that is dynamically loadable at run time.

Logical partitions (408, 410) each share the same kernel (416) which is removed from its traditional location in the logical partition and installed in partition manager space where it is available for use by any logical partition requiring a kernel of the same type. Kernel (416) provides kernel services to logical partitions, each of which may require different computer resources, by use of generic data structures (420, 421) specifying computer resources assigned to each of the logical partitions that uses the kernel. In this example, kernel (416) uses two such generic data structures (420, 421), one each for logical partitions (408, 410).

In using generic data structures to provide kernel services to logical partitions, kernel (416) implements indirect memory addressing to distinguish the specifications in the generic data structures. Such indirect addressing is implemented with pointers, indirect address references to the generic data structures themselves. In this way, when partition manager dispatches to run state a logical processor of a logical partition, the partition manager provides to the kernel a pointer to a generic data structure specifying computer resources assigned to that logical partition. While providing kernel services in response to system calls from user-level software in that partition, the kernel uses the specifications of resources for that partition from the generic data structure addressed by the pointer. A logical processor is dispatched by the partition manager's dispatching its underlying virtual processor. In the example of FIG. 2, dispatching virtual processor (122) dispatches logical processor (106). Dispatching virtual processor (126), however, dispatches both logical processors (110, 112) because logical partition (410), running in SMT mode, has two logical processors per virtual processor.

For a more specific example: Kernel (416) may provide kernel services to logical partitions by use of generic data structures (420, 421) specifying computer resources assigned to each of the logical partitions that uses the kernel, when partition manager (422) dispatches to run state logical processor (106) of logical partition (408). The partition manager (422) provides to the kernel (416) a pointer (510) to generic data structure (420) specifying computer resources assigned to that logical partition (408). The pointer (510) contains the address, that is the beginning address, of the generic data structure (420), and while providing kernel services in response to system calls from user-level software in that logical partition (408), the kernel uses the specifications of resources for that partition from the generic data structure (420) addressed by the pointer (510).

Similarly, when partition manager (422) dispatches to run state logical processors (110, 112) of logical partition (410), the partition manager (422) provides to the kernel (416) a pointer (510) to generic data structure (421) specifying computer resources assigned to that logical partition (410). The pointer (510) contains the address, that is the beginning address, of the generic data structure (421), and while providing kernel services in response to system calls from user-level software in that logical partition (410), the kernel uses the specifications of resources for that partition from the generic data structure (421) addressed by the pointer (510).

In each case, in order to redirect kernel services to a different specification of resources for a logical partition, upon dispatching a logical processor of the logical partition, partition manager (422) needs merely to maintain a pointer address available to the kernel. If a logical processor newly dispatched is from the same logical partition as its immediate predecessor, the pointer address is already correctly set. If a logical processor newly dispatched is from a logical partition other than the logical partition of its immediate predecessor, the pointer address is reset to point to the generic data structure that specifies the computer resources for the logical partition of the new dispatched logical processor.

Figure 3A:
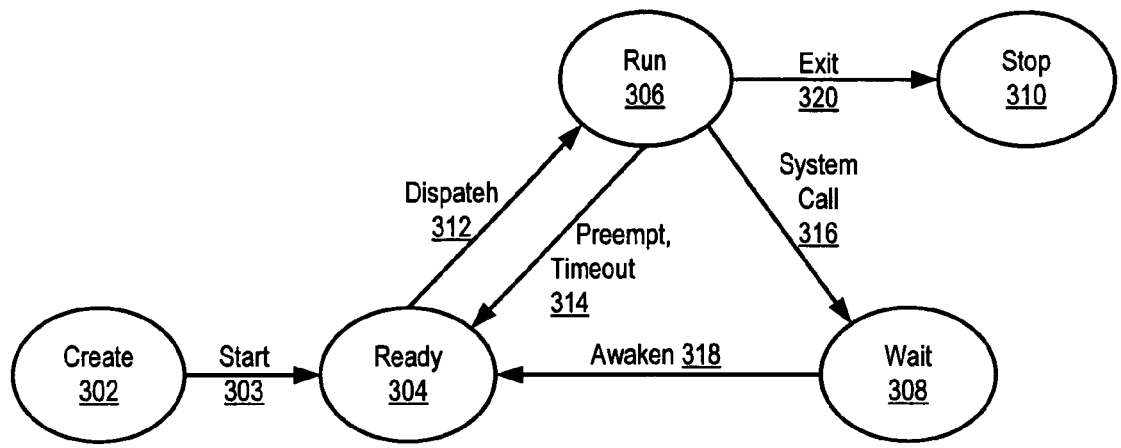
FIG. 3A sets forth a state diagram illustrating exemplary thread states for sharing a kernel of an operating system among logical partitions according to embodiments of the present invention.

For further explanation, FIG. 3A sets forth a state diagram illustrating exemplary thread states for sharing a kernel of an operating system among logical partitions according to embodiments of the present invention. The bubbles in FIG. 3A represent thread states. The arrows between the bubbles represent state transitions effected by kernel functions. The thread states represented in FIG. 3A include a create state (302), a ready state (304), a run state (306), a wait state (308), and a stop state (310). A thread resides temporarily in the create state (302) when the thread is first created at the request of another thread, to give the kernel time to gather information and resources for the thread. As soon as the kernel prepares the thread to run, it is 'started' (303), that is, moved to the ready state (304).

Threads in the ready state (304) are queued, in a ready queue (not shown) waiting for an opportunity to run. The process of determining which ready thread will run next is called 'scheduling.' There are many scheduling algorithms, FIFO, Round Robin, Priority, and so on, and any of them may be used in a system that shares kernels according to embodiments of the present invention. The kernel function for moving a thread from ready state to run state is called dispatching (312). In fact, 'dispatched,' 'running,' and 'in run state,' are generally synonymous.

When a thread is dispatched, that is, in run state (306), the thread is presently assigned to execute on a logical processor. Whether the thread is physically executing depends on whether the logical processor's virtual processor is currently dispatched through its partition manager, that is, currently executing in a time slice on a physical processor. A ready queue for a logical processor may contain one, two, or more threads in ready state waiting to run on the logical processor. Only one thread at a time is placed in run state on a logical processor.

Threads can lose possession of the logical processor, be removed from run state to ready state, by preemption or time out (314). A thread is preempted when a thread having a higher priority enters the ready queue for the logical processor. A thread times out if it retains possession of the logical processor, that is, remains in run state, through its entire time slice.

A thread also may leave run state (306) by issuing a system call (316) and entering wait state (308)—to wait for completion of the system call. Such system calls may be requests for any service provided by a kernel, including for example, intentional requests to sleep or wait for a certain period of time, requests for data to be read from or written to disk, requests for data to be read from or written to input/output resources, and so on.

Figure 3B:
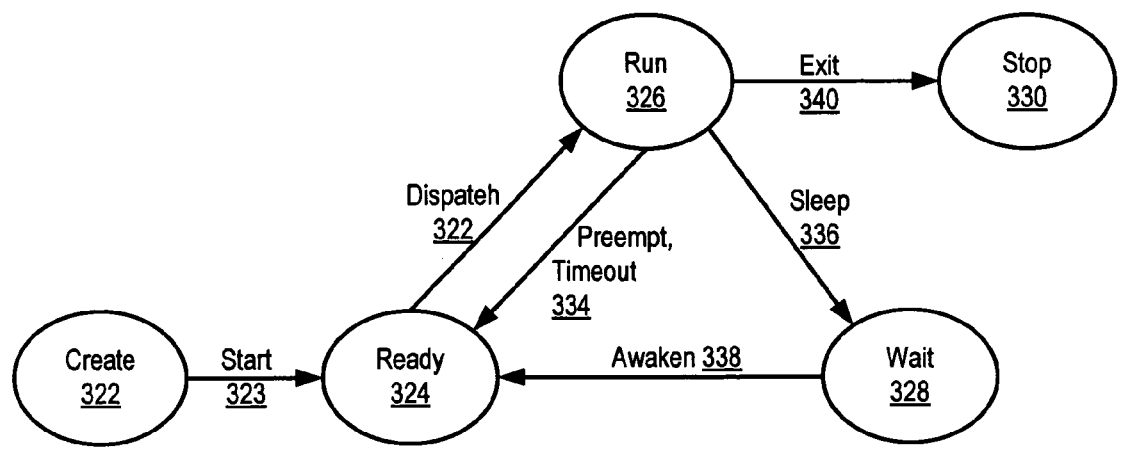
FIG. 3B sets forth a state diagram illustrating exemplary virtual processor states for scheduling virtual processors in a computer system that shares kernels according to embodiments of the present invention.

For further explanation, FIG. 3B sets forth a state diagram illustrating exemplary virtual processor states for scheduling virtual processors in a computer system that shares kernels according to embodiments of the present invention. The bubbles in FIG. 3B represent virtual processor states. The arrows between the bubbles represent state transitions effected by functions of a partition manager. The virtual processor states represented in FIG. 3B include a create state (322), a ready state (324), a run state (326), a wait state (328), and a stop state (330). A virtual processor resides temporarily in the create state (322) when the virtual processor is first created, typically at boot time, to give the partition manager time to gather information and resources for the virtual processor. As soon as the partition manager prepares the virtual processor to run, the virtual processor is 'started' (323), that is, moved to the ready state (324).

Virtual processors in the ready state (324) are queued in a ready queue (not shown) waiting for an opportunity to run. A partition manager schedules virtual processors to run, according to one or more scheduling algorithms, Round Robin, Priority, and so on. The partition manager dispatches (322) from the ready state to the run state the single virtual processor from the ready queue presently most qualified for actual possession of the physical processor to which the virtual processor is assigned. Only one virtual processor at a time is placed in run state on a physical processor.

Virtual processors can lose possession of the physical processor and be removed from run state to ready state by preemption or by time out (334). A virtual processor is preempted when a virtual processor having a higher priority enters the ready queue for the physical processor. A virtual processor times out if it retains possession of the physical processor, that is, remains in run state, through its entire time slice.

A virtual processor also may leave run state (326) by issuing a system call and entering wait state (328)—to wait for completion of the system call. Such system calls include intentional requests to sleep or wait for a certain period of time, requests for data to be read from or written to disk, requests for data to be read from or written to input/output resources, and so on. When a thread running on a virtual processor, that is, running on a logical processor of a logical partition, issues a system call to wait for keyboard input or to read a file from disk, for example, the virtual processor may determine that there is no need for the virtual processor to continue to occupy the physical processor merely to do nothing until a keystroke arrives or the disk read completes. In this circumstance, the virtual processor may put itself to sleep (336) for a certain period off time, a tenth of a second for example. Returning the virtual processor from wait state to ready state is referred to as awakening (338) the virtual processor.

Figure 4:
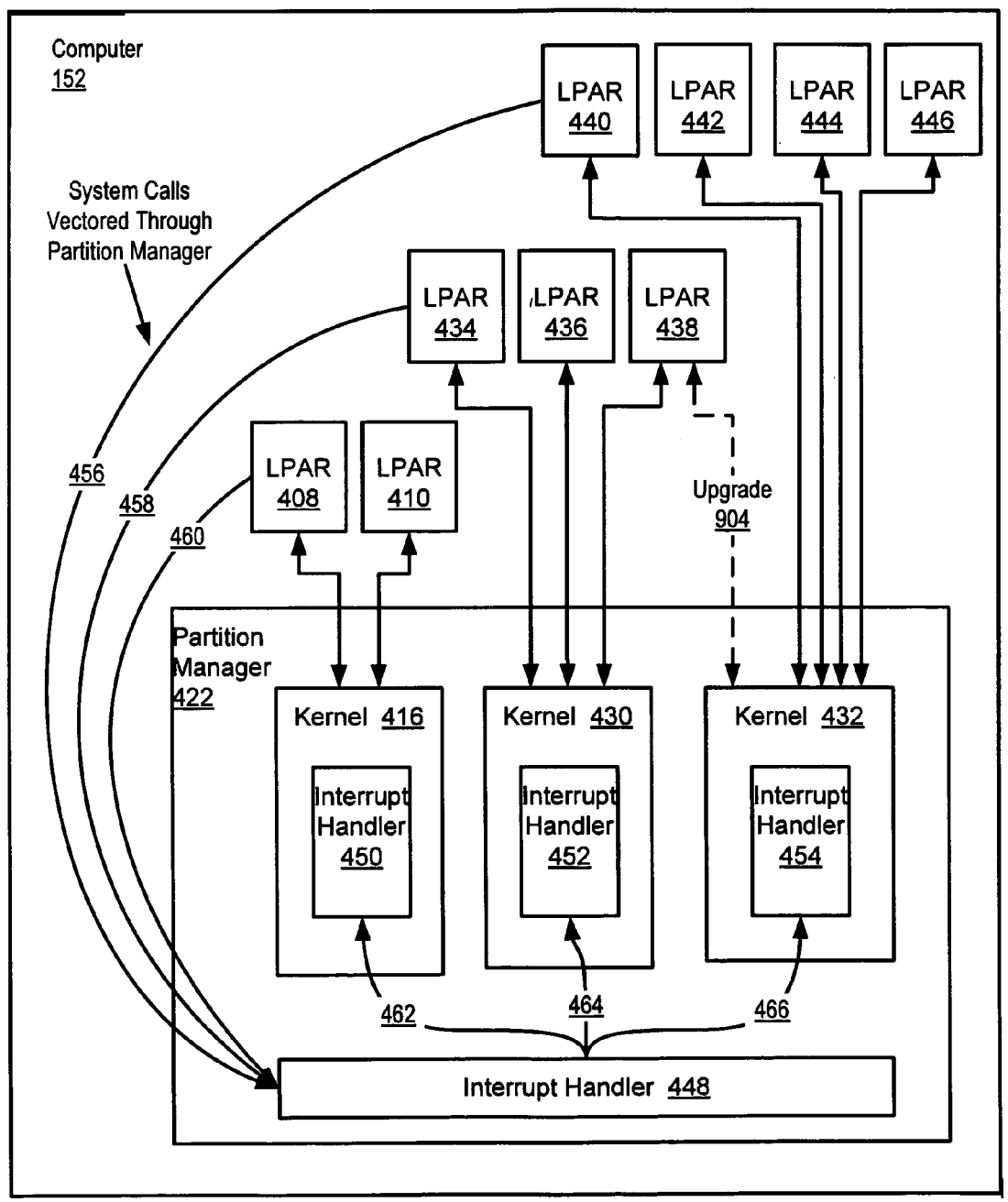
FIG. 4 sets forth a functional block diagram illustrating a further exemplary system for sharing a kernel of an operating system among logical partitions according to embodiments of the present invention.

For further explanation, FIG. 4 sets forth a functional block diagram illustrating a further exemplary system for sharing a kernel of an operating system among logical partitions according to embodiments of the present invention. For convenience of explanation, the example of FIG. 1 included only one logical partition. For convenience of explanation, the example of FIG. 2 included only one shared kernel. The system of FIG. 4, however, includes nine logical partitions sharing among them three shared kernels, further explaining the fact that systems for sharing kernels according to embodiments of the present invention may share any number of kernels among any number of logical partitions. The system of FIG. 4 includes logical partitions (408, 410), each of which shares kernel (416). The system of FIG. 4 also includes logical partitions (434, 436, 438), each of which shares kernel (430). The system of FIG. 4 also includes logical partitions (440, 442, 444, 446), each of which shares kernel (432).

In the system of FIG. 4, partition manager (422) has an interrupt handler (448) and each kernel (416, 430, 432) has an interrupt handler (450, 452, 454). An interrupt handler is a protected software routine that intercepts system calls and passes them to a subroutine according to interrupt type. An interrupt that requests a disk I/O service is passed to a disk driver. An interrupt that requests input from a keyboard is passed to a keyboard driver. And so on. An interrupt handler's interception of a system call is supported by hardware, requiring a protected register or memory location in which is stored the address of the interrupt handler—protected so that privileged code only, not ordinary user code, can grant access to protected computer resources. In the system of FIG. 4, however, because a shared kernel is no longer embedded in an operating system of a single logical partition, there is no inherent one-to-one relationship between any particular system call and a particular kernel. The system of FIG. 4, therefore, is configured to vector all system calls (456, 458, 460) through its partition manager (422) by setting the protected registers or memory variables for all interrupt processing to the starting address of the partition manager's interrupt handler (448). The partition manager's interrupt handler (448)

then passes (462, 464, 466) the system call to a kernel's interrupt handler, first determining which kernel to which the interrupt is to be passed by use of a data structure such as, for example, the one illustrated as Table 1:

TABLE 1

| Logical Partition | Kernel | Structure Pointer |
|---|---|---|
| 408 | 416 | structPtr1 |
| 410 | 416 | structPtr2 |
| 434 | 430 | structPtr3 |
| 436 | 430 | structPtr4 |
| 438 | 430 | structPtr5 |
| 440 | 432 | structPtr6 |
| 442 | 432 | structPtr7 |
| 444 | 432 | structPtr8 |
| 446 | 432 | structPtr9 |

Each record of Table 1 associates a logical partition identifier, a kernel identifier, and a pointer to a generic data structure that specifies resources assigned to a particular logical partition. The partition manager's interrupt handler (448), upon intercepting a system call from a logical partition, may, by use of the logical partition identifier, lookup in such a table the identity of the kernel to which to pass the system call.

A structure such as Table 1, associating as it does not only the kernel identifier but also a pointer to a generic data structure for a logical partition, may do double duty. When a partition manager dispatches to run state a logical processor of a logical partition and provides to a shared kernel a pointer to a generic data structure specifying computer resources assigned to that logical partition, the partition manager may use the identity of the logical partition to determine which pointer value to provide to the kernel.

Figure 5:
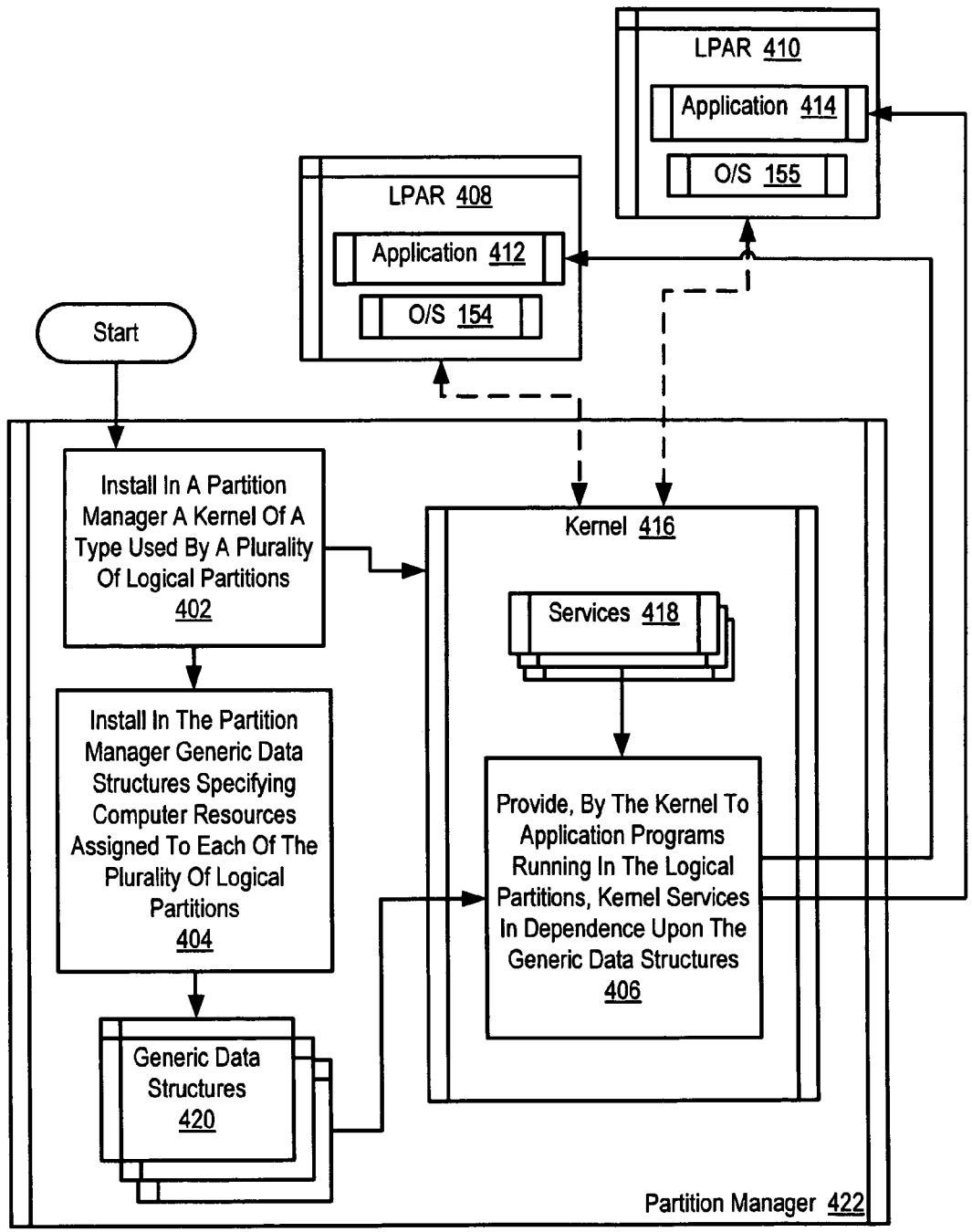
FIG. 5 sets forth a flow chart illustrating an exemplary method for sharing a kernel of an operating system among logical partitions according to embodiments of the present invention.

For further explanation, FIG. 5 sets forth a flow chart illustrating an exemplary method for sharing a kernel (416) of an operating system among logical partitions according to embodiments of the present invention that includes installing (402) in a partition manager (422) a kernel (416) of a type used by a plurality of logical partitions (408, 410). Installing such a kernel may be carried out by use of subroutines of the partition manager that install a kernel with its boot sectors on a disk drive, for example, so that the boot sector can be accessed at boot time for the kernel. Such subroutines typically are accessed by a system administrator or other authorized user through a GUI tool or command line interface exposed by a partition manager through a primary partition or through a command console coupled directly to the partition manager.

The method of FIG. 5 also includes installing (404) in the partition manager (422) generic data structures (420) specifying computer resources assigned to each of the plurality of logical partitions. Installing generic data structures may be carried out by use of subroutines of the partition manager improved for that purpose. A partition manager typically provides subroutines for creating and maintaining logical partitions. Such subroutines are improved according to embodiments of the present invention to include functions that create the generic data structures and associate pointers to them with logical partition identifiers as illustrated in Table 1 and in table (514) on FIGS. 8 and 9. Such subroutines typically are accessed by a system administrator or other authorized user through a GUI tool or command line interface exposed by a partition manager through a primary partition or through a command console coupled directly to the partition manager.

The method of FIG. 5 also includes providing (406), by the kernel (416) to the logical partitions, kernel services in dependence upon the generic data structures. A traditional kernel maintains within the kernel itself data structures specifying computer resources assigned to the partition in which the kernel is running as part of an operating system. When a kernel is improved to be moved outside its operating system and shared among partitions according to embodiments of the present invention, the kernel is modified to access information regarding computer resources for a partition from generic data structures established and maintained outside the kernel in partition manager space. System calls to a shared kernel (416) from software applications (412, 414) running in a logical partition typically request access to or services dependent upon computer resources protected and administered by the kernel. Such a shared kernel, in responding to system calls from software running in a logical partition, accesses needed information regarding computer resources for a partition from generic data structures (420) whose contents specify the computer hardware and other resources assigned for use by the partition.

Figure 6:
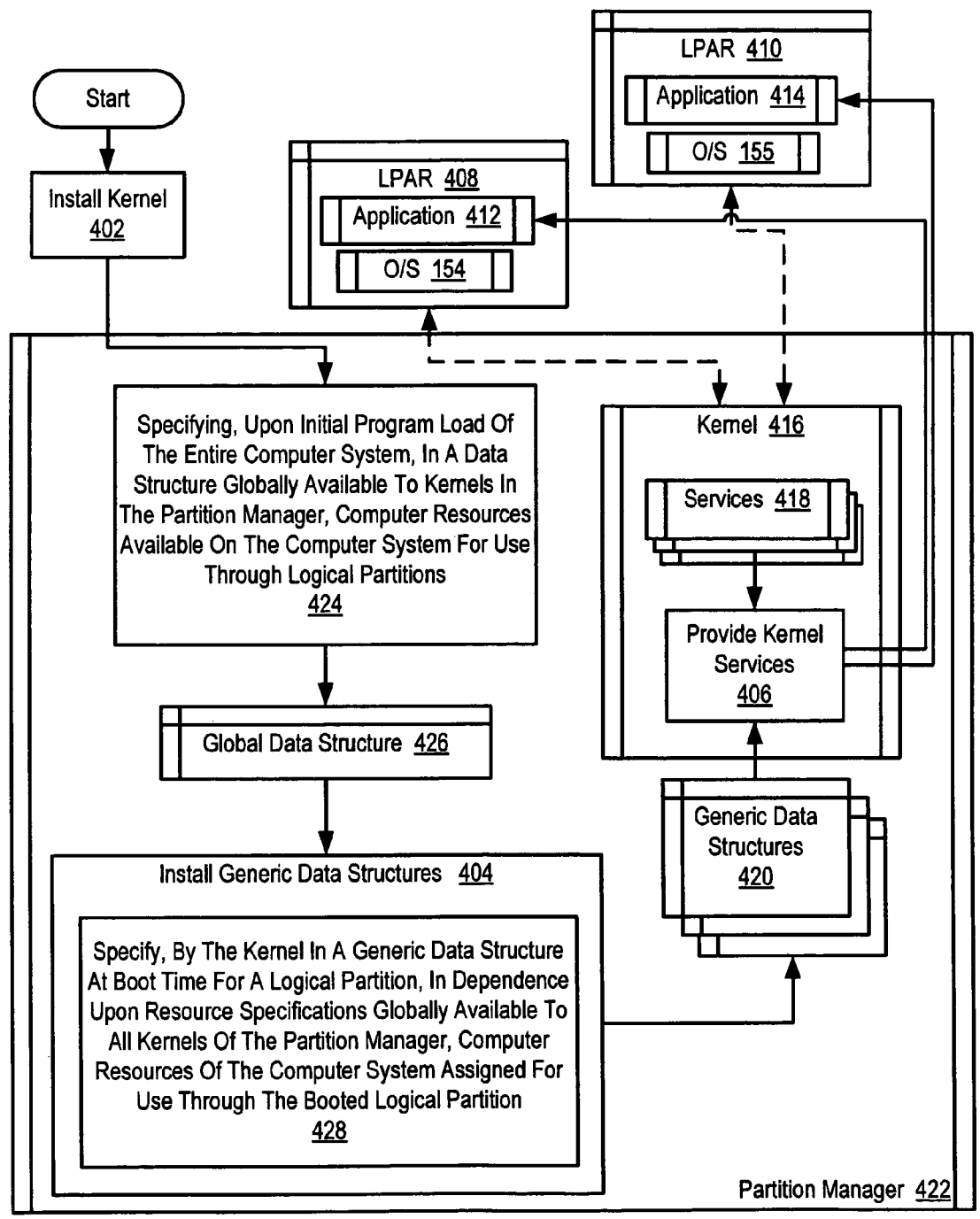
FIG. 6 sets forth a flow chart illustrating a further exemplary method for sharing a kernel of an operating system among logical partitions according to embodiments of the present invention.

For further explanation, FIG. 6 sets forth a flow chart illustrating a further exemplary method for sharing a kernel (416) of an operating system among logical partitions according to embodiments of the present invention. The method of FIG. 6 is similar to the method of FIG. 5. That is, the method of FIG. 6 includes installing (402) in a partition manager (422) a kernel (416) of a type used by a plurality of logical partitions (408, 410), installing (404) in the partition manager (422) generic data structures (420) specifying computer resources assigned to each of the plurality of logical partitions, and providing (406) kernel services in dependence upon the generic data structures, all of which operate generally as described above with reference to the method of FIG. 5.

The method of FIG. 6, however, also includes specifying (424), upon initial program load of the entire computer system, in a data structure (426) globally available to kernels in the partition manager, computer resources available on the computer system for use through logical partitions. The initial program load may occur when power is initially applied to the entire computer system, or the initial program load may occur in a reset or a warm reboot of the entire system. The distinction is that the initial program load is a reload of the entire system, the partition manager and all active logical partitions—rather than an activation of a logical partition as such. In this specification, bringing up the entire system is referred to as 'initial program load,' and activating a logical partition is referred to as 'booting' the logical partition.

Figure 7A:
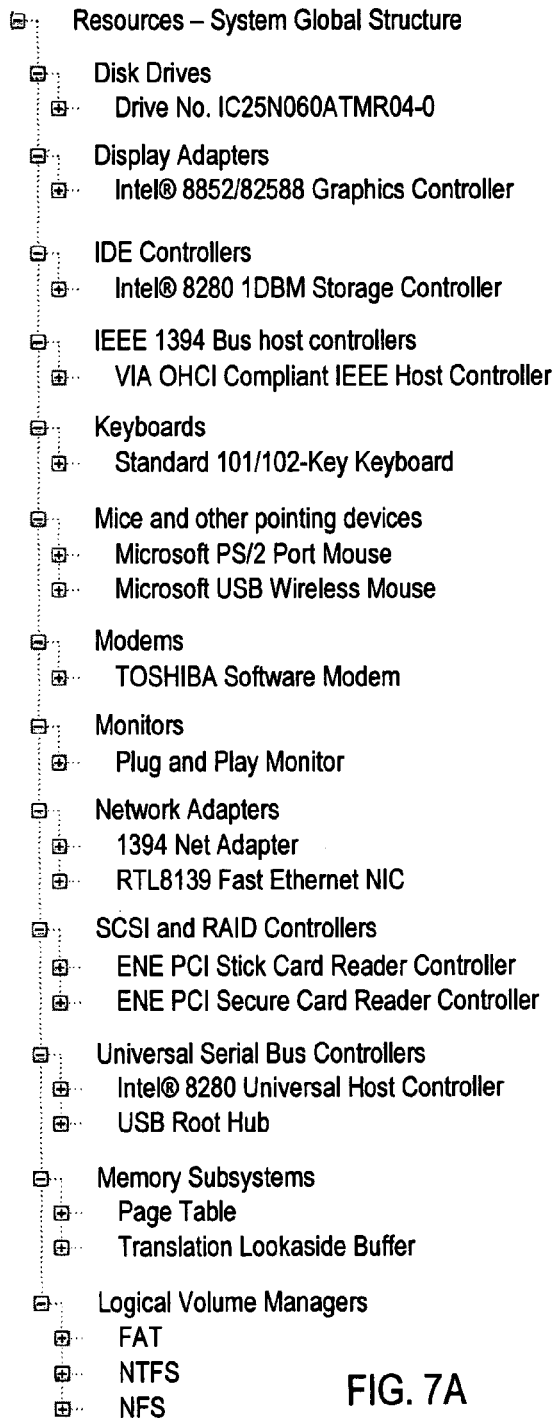
FIG. 7A sets forth a schematic diagram of a data structure globally available to kernels for specifying computer resources available on a computer system for use through logical partitions.

For further explanation, FIG. 7A sets forth a schematic diagram of a data structure globally available to kernels for specifying computer resources available on a compute system for use through logical partitions. Computer resources specified in the data structure of FIG. 7A include disk drives, display adapters, IDE controllers, 1394 or 'firewire' controllers, keyboards, mice, modems, monitors, and so on. The data structure of FIG. 7A is a structure of a kind sometimes referred to as a 'device tree,' a structure loaded at system initial program load from information stored in non-volatile memory. In various forms of Unix, for example, a device tree may be loaded from information stored on disk at path locations '/devices' and '/dev.' Such a structure is made globally available to kernels in a partition manager in systems that share kernels according to embodiments of the present invention and specifies computer resources available on the computer system for use through logical partitions, that is, for use by applications and other software running in logical partitions.

The data structure of FIG. 7A is illustrated as a tree structure, but that is only for explanation, not a limitation of the present invention. A data structure that specifies computer resources available on a computer system for use through logical partitions may be implemented, for example, as a C-style structure:

```
struct {
    char DiskDrives[256];
    char DisplayAdapters[256];
    char IDE_Controllers[256];
    char IEEE_1394_Controllers[256];
    char Keyboards[256];
    char MiceAndOtherPointingDevices[256];
    char Monitors[256];
    char NetworkAdapters[256];
    ...
} Resources-SystemGlobalStructure;
```

A data structure that specifies computer resources available on a computer system for use through logical partitions may be implemented as such a C-style structure, as an array, a linked list, a table, and as structures of other kinds as will occur to those of skill in the art.

In addition, in the method of FIG. 6, installing (404) generic data structures also includes specifying (428), by the kernel in a generic data structure at boot time for a logical partition in dependence upon resource specifications (426) globally available to all kernels of the partition manager, computer resources of the computer system assigned for use through the booted logical partition. The resource specifications (426) globally available to all kernels of the partition manager are provided in a data structure globally available to kernels for specifying computer resources available on a compute system as described above.

Specifying (428) computer resources of the computer system assigned for use through the booted logical partition may be carried out by extracting from a global data structure the resource specifications identified in data structure representing a logical partition. Data representing each logical partition is created by a system administrator or other authorized user when each logical partition is defined through a GUI tool or command line interface exposed by a partition manager through a primary partition or through a command console coupled directly to the partition manager. In this example, a kernel's boot routines are improved to specify (428) computer resources of the computer system assigned for use through the booted logical partition by extracting from a global data structure, such as the one illustrated in FIG. 7A, the resource specifications identified in data structure representing a logical partition—and installing the resource specifications in a generic data structure for a logical partition such as the generic data structure illustrated in FIG. 7B.

Figure 7B:
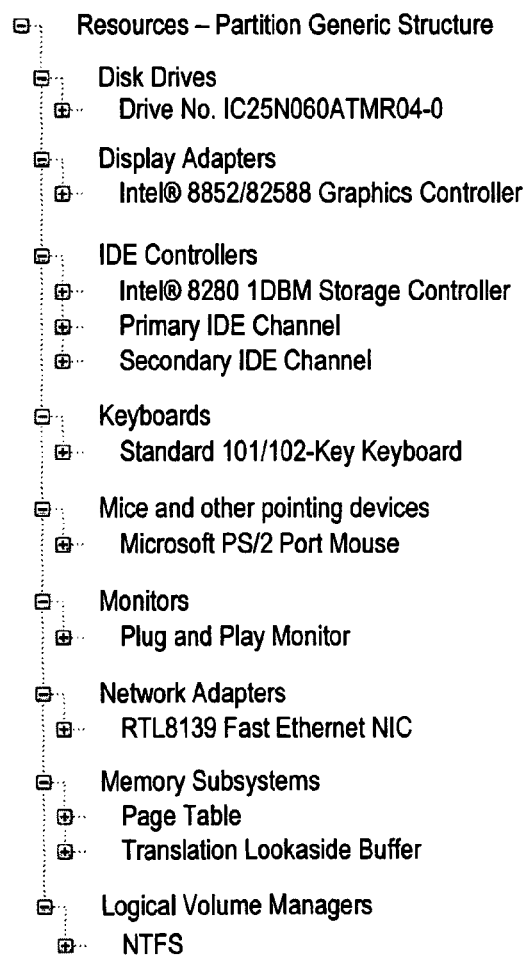
FIG. 7B sets forth a schematic diagram of a generic data structure that specifies computer resources assigned to a logical partition.

For further explanation, FIG. 7B sets forth a schematic diagram of a generic data structure that specifies computer resources assigned to a logical partition. The data structure of FIG. 7B, similar to the structure of FIG. 7A, is a structure of a kind sometimes referred to as a 'device tree,' a structure loaded at kernel boot time from information stored in non-volatile memory. In various forms of Unix, for example, a device tree may be loaded from information stored on disk at path locations '/devices' and '/dev.'

The data structure of FIG. 7B is illustrated as a tree structure, but that is only for explanation, not a limitation of the present invention. A generic data structure that specifies computer resources assigned to a logical partition may be implemented, for example, as a C-style structure:

```
struct {
    char DiskDrives[256];
    char DisplayAdapters[256];
    char IDE_Controllers[256];
    char IEEE_1394_Controllers[256];
    char Keyboards[256];
    char MiceAndOtherPointingDevices[256];
    char Monitors[256];
    char NetworkAdapters[256];
    ...
} Resources-PartitionGenericStructure;
```

Such structures are generic in the sense that each provides the same interface for data access to all shared kernels of a partition manager. If the C-style structure just above were taken as an example of a generic data structure that specifies computer resources assigned to a logical partition, then each kernel may possess a pointer to such a structure created by:
    struct *structptr=&Resources-PartitionGenericStructure;
Then each kernel may access display adapter specifications for a logical partition by, for example:
    char *displayAdapterInfo=strcpy
        (structPtr→DisplayAdapters);
And each kernel may access disk drive specifications for a logical partition by, for example:
    strcpy(diskDriveInfo, structPtr→DiskDrives);
And each kernel may access specifications for disk drives with integrated drive electronic ('IDE') for a logical partition by, for example:
    strcpy(IDE_Info, structPtr→IDE_Controllers);
And so on, with all references to the same type of information implemented with the same syntax although the information retrieved by the reference will vary from logical partition to logical partition. The variance from logical partition to logical partition is effected by varying the value of structPtr. The value of structPtr is different for each logical partition because structPtr's value is set by a partition manager to point to a different generic data structure for each logical partition. In this example, using a pointer to a generic data structure named 'structPtr,' the value of structPtr for a shared kernel is checked by the partition manager every time the partition manager dispatches a logical processor of a logical partition that uses the kernel.

In addition to implementation as a C-style structure, a generic data structure that specifies computer resources assigned to a logical partition may be implemented, for example, as an array having standardized offsets to subarrays each of which contains specifications for a type of resource assigned to a logical partition. A generic data structure that specifies computer resources assigned to a logical partition may be implemented as a C-style structure, an array, a linked list, a table, and as structures of other kinds as will occur to those of skill in the art.

Figure 8:
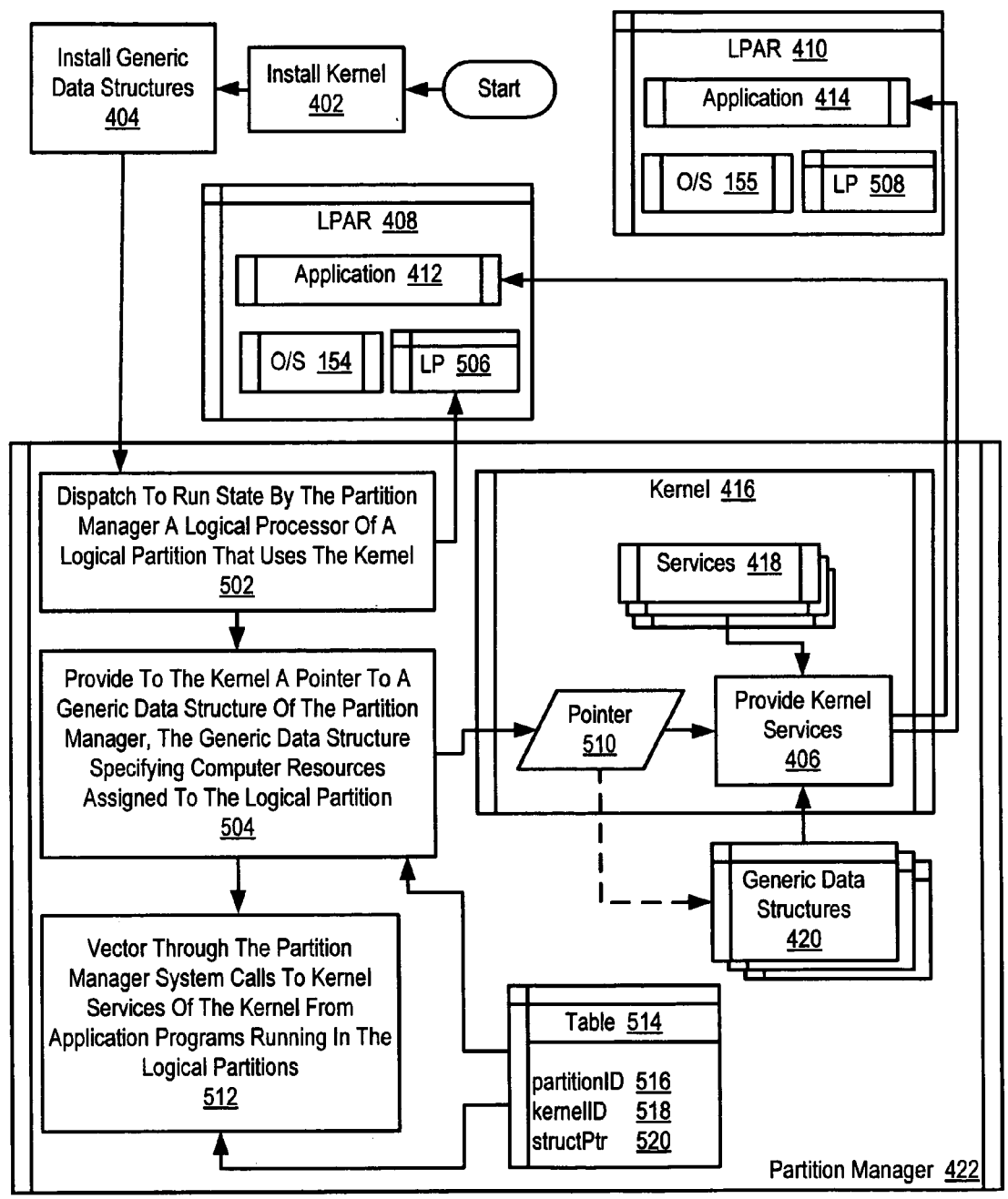
FIG. 8 sets forth a flow chart illustrating a further exemplary method for sharing a kernel of an operating system among logical partitions according to embodiments of the present invention.

For further explanation, FIG. 8 sets forth a flow chart illustrating a further exemplary method for sharing a kernel (416) of an operating system among logical partitions according to embodiments of the present invention. The method of FIG. 8 is similar to the method of FIG. 5. That is, the method of FIG. 8 includes installing (402) in a partition manager (422) a kernel (416) of a type used by a plurality of logical partitions (408, 410), installing (404) in the partition manager (422) generic data structures (420) specifying computer resources assigned to each of the plurality of logical partitions, and providing (406) kernel services in dependence upon the generic data structures, all of which operate generally as described above with reference to the method of FIG. 5.

The method of FIG. 8, however, also includes dispatching (502) to run state by the partition manager (422) a logical processor (506) of a logical partition (408) that uses the kernel (416). A partition manager dispatches a logical processor by selecting, according to a scheduling algorithm, a corresponding virtual processor waiting in wait state in a ready queue for a physical processor and granting the virtual processor possession of the physical processor.

In responding to system calls effected by threads running in a logical partition on the newly dispatched logical processor, a kernel will need to know which of a multiplicity of generic data structures specifies computer resources for the logical partition of the newly dispatched logical processor. The method of FIG. 8 therefore also includes providing (504) to the kernel a pointer (510) to a generic data structure (420) of the partition manager, the generic data structure specifying computer resources assigned to the logical partition, that is, the logical partition of the newly dispatched logical processor. If a logical processor newly dispatched is from the same logical partition as its immediate predecessor, that is, the logical processor whose virtual processor just lost possession of the physical processor on which the corresponding virtual processor is now running, the pointer address is already correctly set. If a logical processor newly dispatched is from a logical partition other than the logical partition of its immediate predecessor, the pointer address is reset to point to the generic data structure that specifies the computer resources for the logical partition of the new dispatched logical processor. The partition manager may know the correct value for the pointer by looking it up in dependence upon the identity of the logical partition in a data structure that associates pointer values and partition identities such as the one illustrated above in Table 1, for example, or in table (514) on FIGS. 8 and 9.

The method of FIG. 8 also includes vectoring (512) through the partition manager (422) system calls to kernel services (418) of the kernel from application programs (412, 414) running in the logical partitions (408, 410). The partition manager may vector system calls to the kernel by setting a pointer in a protected register or a protected memory variable for all interrupt processing to point to the starting address of the partition manager's interrupt handler (448 on FIG. 4). The partition manager's interrupt handler then passes the system calls to a kernel's interrupt handler (450, 452, 454 on FIG. 4), first determining which kernel to which the interrupt is to be passed by use of a data structure such as, for example, the one illustrated in Table 1 above or in table (514) on FIGS. 8 and 9. Each record of Table 1 associates a logical partition identifier and a kernel identifier. The partition manager's interrupt handler, upon intercepting a system call from a logical partition, may, by use of the identity of the logical partition, lookup in such a table the identity of the kernel to which to pass the system call.

Figure 9:
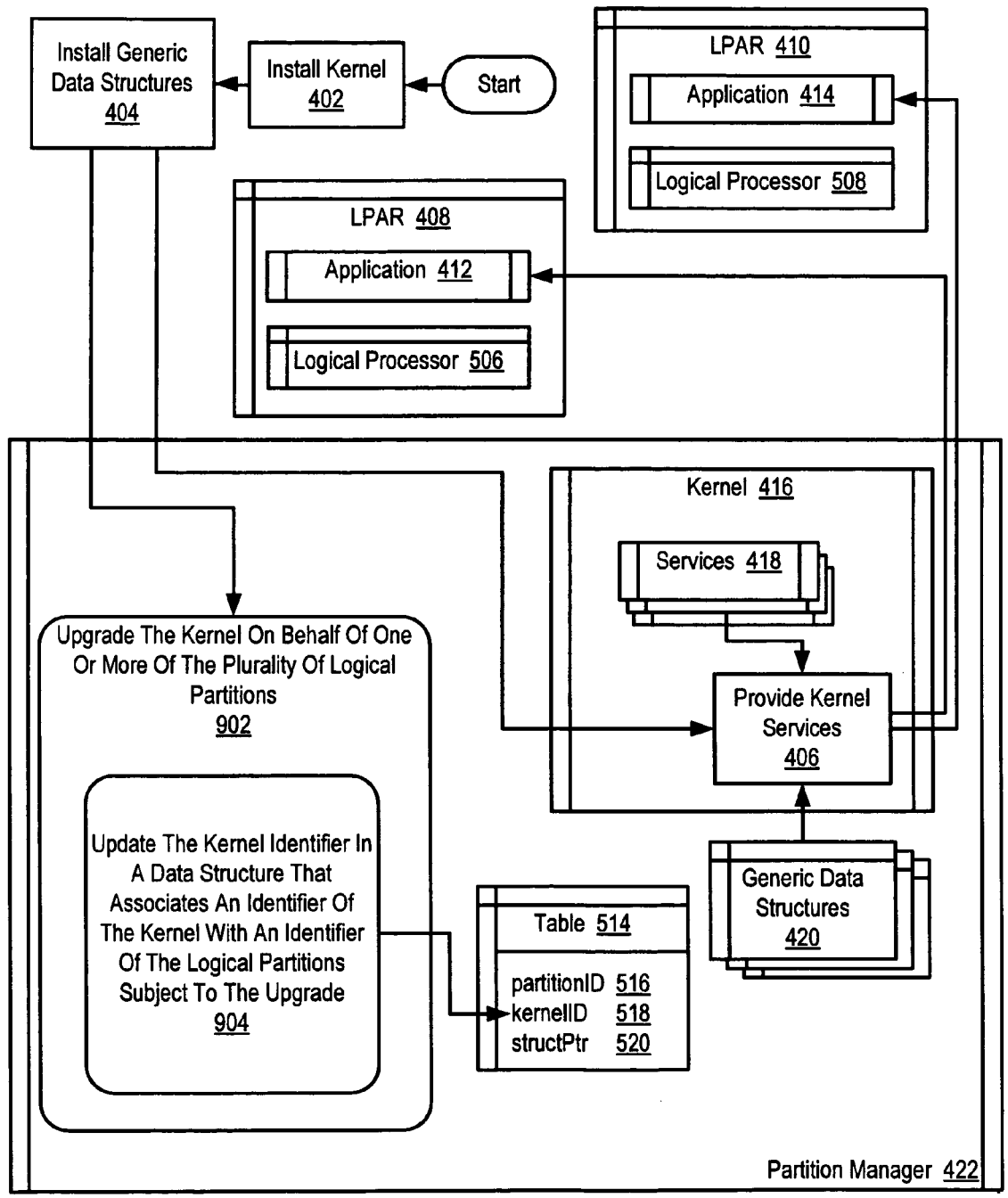
FIG. 9 sets forth a flow chart illustrating a further exemplary method for sharing a kernel of an operating system among logical partitions according to embodiments of the present invention.

For further explanation, FIG. 9 sets forth a flow chart illustrating a further exemplary method for sharing a kernel (416) of an operating system among logical partitions according to embodiments of the present invention. The method of FIG. 9 is similar to the method of FIG. 5. That is, the method of FIG. 9 includes installing (402) in a partition manager (422) a kernel (416) of a type used by a plurality of logical partitions (408, 410), installing (404) in the partition manager (422) generic data structures (420) specifying computer resources assigned to each of the plurality of logical partitions, and providing (406) kernel services in dependence upon the generic data structures, all of which operate generally as described above with reference to the method of FIG. 5. The method of FIG. 9, however, also includes upgrading (904) the kernel (416) on behalf of one or more of the plurality of logical partitions (408, 410), including updating (904) a kernel identifier (518) in a data structure (514) that associates a kernel identifier with an identifier (516) of the logical partitions subject to the upgrade.

Upgrading a kernel on behalf of a logical partition is explained further with reference to FIG. 4. FIG. 4 sets forth a functional block diagram illustrating an exemplary system for sharing a kernel of an operating system among logical partitions according to embodiments of the present invention where the exemplary system includes nine logical partitions sharing among them three shared kernels. Assume for purposes of explanation that kernel (430) is a kernel for a versions of an operating system, and kernel (432) is a kernel for a later, more advanced, version of the same operating system. Applications running in logical partitions (434, 436) are satisfied with the old kernel. A system administrator decides, however, that applications running in logical partition (438) will benefit from access to newer features of the later version of the kernel. The administrator may upgrade (904) the kernel on behalf of logical partition (438) by updating a kernel identifier in a data structure that associates a kernel identifier with an identifier of the logical partition subject to the upgrade. The update may be accomplished by the system administrator's logging on to a console of the partition manager that provides a GUI tool to update a data structure such as the one illustrated by Table 1. Table 2 illustrates the associated data values after the update:

TABLE 2

| Logical Partition | Kernel | Structure Pointer |
|---|---|---|
| 408 | 416 | structPtr1 |
| 410 | 416 | structPtr2 |
| 434 | 430 | structPtr3 |
| 436 | 430 | structPtr4 |
| 438 | 432 | structPtr5 |
| 440 | 432 | structPtr6 |
| 442 | 432 | structPtr7 |
| 444 | 432 | structPtr8 |
| 446 | 432 | structPtr9 |

The only difference between Table 1 and Table 2 is the value of the kernel identifier associated with logical partition (438), which is updated from 430 to 432. Notice that there is no need to update the pointer to the generic data structure that specifies computer resources assigned for use through the logical partition subject to the upgrade; it remains set to 'structPtr4.' The logical partition (438) upgraded to the later version of the kernel continues to use the same generic data structure to specify its computer resources that it used before the upgrade.

Exemplary embodiments of the present invention are described largely in the context of a fully functional computer system for sharing a kernel of an operating system among logical partitions. Readers of skill in the art will recognize, however, that the present invention also may be embodied in a computer program product disposed on recordable media for machine-readable information, including magnetic media, optical media, or other suitable media. Examples of recordable media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a program product, Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for sharing a kernel of an operating system among logical partitions, the method comprising:
    installing in a partition manager a kernel for sharing among a plurality of logical partitions created on a single computer system, the partition manager providing system-level support for the establishment and operation of multiple logical partitions on the single computer system, wherein each of the logical partitions have an operating system that provides functionality not provided by the shared kernel, the shared kernel at least providing access to hardware resources of the single computer system, wherein the functionality provided by the operating system of each of the logical partitions and not provided by the shared kernel comprises support for graphical user interfaces, a command line interface to a utility of the operating system, a system utility accessible through a graphical user interface or shell, and an application programming interface to access a hardware-dependent service for a call into a privileged routine in the shared kernel;
    installing in the partition manager generic data structures for the plurality of logical partitions, each of the generic data structures specifying computer resources of the single computer system assigned to a corresponding one of the plurality of logical partitions; and
    providing, by the shared kernel to the plurality of logical partitions, kernel services in dependence upon the generic data structures.

2. The method of claim 1 further comprising:
    dispatching a virtual processor to run state by the partition manager, wherein said dispatching the virtual processor to run state causes dispatch of a logical processor of a logical partition associated with the virtual processor.

3. The method of claim 1 further comprising vectoring through the partition manager system calls to kernel services from application programs running in the plurality of logical partitions, wherein said vectoring through the partition manager system calls to kernel services comprises a handler of the partition manager receiving the system calls, the handler determining that the system calls are from logical partitions associated with the shared kernel, and the handler submitting the system calls to the shared kernel.

4. The method of claim 3, further comprising vectoring through the partition manager system calls to kernel services from application programs running on a second plurality of logical partitions on the single computer system, wherein said vectoring through the partition manager system calls to kernel services comprises the handler of the partition manager receiving the system calls to kernel services, the handler determining that each of the second plurality of logical partitions is associated with a second shared kernel that is shared among the second plurality of logical partitions, and the handler submitting the system calls to the second shared kernel.

5. The method of claim 1 further comprising specifying, upon initial program load of the entire computer system, in a data structure globally available to kernels in the partition manager, computer resources available on the single computer system for use through logical partitions.

6. The method of claim 1 further comprising upgrading a first of the plurality of logical partitions from the shared kernel to a second kernel installed in the partition manager, wherein said upgrading the first logical partition from the shared kernel to the second kernel installed in the partition manager comprises modifying data that associates the first logical partition with the shared kernel to indicate that the first logical partition is associated with the second kernel instead of the shared kernel, wherein the data continues to reference the generic data structure corresponding to the first logical partition regardless of the upgrading.

7. A system for sharing a kernel among logical partitions that each have their own operating system, the system comprising a computer processor and a computer memory operatively coupled to the computer processor, the computer memory having disposed within it computer program instructions executable by the computer processor to cause the system to:
    maintain data for each of a plurality of logical partitions that share a kernel, wherein the data specifies resources of the system assigned to each of the plurality of logical partitions, wherein each of the plurality logical partitions have an operating system that provides functionality not provided by the shared kernel, the shared kernel at least providing access to hardware resources of the single computer system, wherein the functionality provided by the operating system of each of the logical partitions and not provided by the shared kernel comprises support for graphical user interfaces, a command line interface to a utility of the operating system, a system utility accessible through a graphical user interface or shell, and an application programming interface to access a hardware-dependent service for a call into a privileged routine in the shared kernel;
    manage virtual processors that correspond to apportionment of physical processors of the system;
    associate at least one logical processor of each logical partition with each of the virtual processors;
    invoke the shared kernel responsive to system calls for kernel services from the plurality of logical partitions.

8. The system of claim 7 further comprising program instructions executable by the computer processor to cause the system to:
    maintain data for each of a second plurality of logical partitions that share a second kernel, wherein the data specifies resources of the system assigned to each of the second plurality of logical partitions;
    invoke the second shared kernel responsive to system calls for kernel services from the second plurality of logical partitions.

9. The system of claim 8 further comprising program instructions executable by the computer processor to cause the system to:
    receive a request for a kernel service;
    determine which of the logical partitions sent the request for the kernel service;
    determine whether the logical partition that sent the request for the kernel service is associated with the shared kernel or the second shared kernel; and
    submit the request to the one of the shared kernel and the second shared kernel that is associated with the logical partition that sent the request.

10. The system of claim 7, wherein a logical processor associated with a logical partition comprises an operating system structure for scheduling execution of threads of the associated logical partition, wherein a virtual processor represents an apportioned fraction of processing capacity of the computer processor.

11. A computer program product for sharing a kernel across logical partitions, the computer program product comprising program instructions disposed on a computer readable storage medium, the computer program instructions comprising computer program instructions to:

maintain data for each of a plurality of logical partitions that share a kernel, wherein the data specifies resources of a system assigned to each of the plurality of logical partitions, wherein each of the plurality logical partitions have an operating system that provides functionality not provided by the shared kernel, the shared kernel at least providing access to hardware resources of the single computer system, wherein the functionality provided by the operating system of each of the logical partitions and not provided by the shared kernel comprises support for graphical user interfaces, a command line interface to a utility of the operating system, a system utility accessible through a graphical user interface or shell, and an application programming interface to access a hardware-dependent service for a call into a privileged routine in the shared kernel;

manage virtual processors that correspond to apportionment of physical processors of the system;

associate at least one logical processor of each logical partition with each of the virtual processors;

invoke the shared kernel responsive to system calls for kernel services from the plurality of logical partitions.

12. The computer program product of claim 11 further comprising program instructions to:

maintain data for each of a second plurality of logical partitions that share a second kernel, wherein the data specifies resources of the system assigned to each of the second plurality of logical partitions;

invoke the second shared kernel responsive to system calls for kernel services from the second plurality of logical partitions.

13. The computer program product of claim 12 further comprising program instructions to:

receive a request for a kernel service;

determine which of the logical partitions sent the request for the kernel service;

determine whether the logical partition that sent the request for the kernel service is associated with the shared kernel or the second shared kernel; and submit the request to the one of the shared kernel and the second shared kernel that is associated with the logical partition that sent the request.

14. The computer program product of claim 11, wherein a logical processor associated with a logical partition comprises an operating system structure for scheduling execution of threads of the associated logical partition, wherein a virtual processor represents an apportioned fraction of processing capacity of the computer processor.

* * * * *